United States Patent
Park et al.

(10) Patent No.: US 10,186,875 B2
(45) Date of Patent: Jan. 22, 2019

(54) COIL TYPE UNIT FOR WIRELESS POWER TRANSMISSION, WIRELESS POWER TRANSMISSION DEVICE, ELECTRONIC DEVICE AND MANUFACTURING METHOD OF COIL TYPE UNIT FOR WIRELESS POWER TRANSMISSION

(71) Applicant: SAMSUNG ELECTRO-MECHANICS CO., LTD., Suwon-si, Gyeonggi-do (KR)

(72) Inventors: Seung Wook Park, Suwon-si (KR); No Il Park, Suwon-si (KR); Doo Sung Jung, Suwon-si (KR); Jang Su Kim, Suwon-Si (KR); Chang Bae Lee, Suwon-Si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 1041 days.

(21) Appl. No.: 14/461,958

(22) Filed: Aug. 18, 2014

(65) Prior Publication Data

US 2015/0076919 A1    Mar. 19, 2015

(30) Foreign Application Priority Data

Aug. 19, 2013   (KR) .......................... 10-2013-0097841

(51) Int. Cl.
*H01F 27/28* (2006.01)
*H02J 5/00* (2016.01)
(Continued)

(52) U.S. Cl.
CPC .......... *H02J 5/005* (2013.01); *H01F 27/2804* (2013.01); *H01F 38/14* (2013.01);
(Continued)

(58) Field of Classification Search
None
See application file for complete search history.

(56) References Cited

U.S. PATENT DOCUMENTS

| 2006/0266435 | A1* | 11/2006 | Yang ................ G06K 19/07771 148/105 |
| 2007/0247268 | A1* | 10/2007 | Oya .................... H01F 17/0006 336/200 |
| 2012/0049991 | A1* | 3/2012 | Baarman ............. H01F 17/0013 336/199 |

FOREIGN PATENT DOCUMENTS

| JP | 2004-140174 A | 5/2004 |
| JP | 2011-124373 A | 6/2011 |

(Continued)

OTHER PUBLICATIONS

Notice of Allowance issued in Korean Application No. 10-2013-0097841 dated May 22, 2014.

*Primary Examiner* — Thienvu Tran
*Assistant Examiner* — David M Stables
(74) *Attorney, Agent, or Firm* — NSIP Law

(57) ABSTRACT

The present invention relates to a coil type unit for wireless power transmission, a wireless power transmission device, an electronic device, and a manufacturing method of a coil type unit for wireless power transmission. A coil type unit for wireless power transmission according to the present invention includes a coil pattern having a wiring pattern shape; a magnetic portion having the coil pattern attached to one surface thereof and a conductive pattern formed thereon; an insulating adhesive portion interposed between the magnetic portion having the conductive pattern formed thereon and the coil pattern to bond the magnetic portion and the coil pattern to each other while insulating the coil pattern and the (Continued)

conductive pattern from each other; and a conductive via for electrically connecting both ends of the coil pattern and the conductive pattern.

11 Claims, 8 Drawing Sheets

(51) Int. Cl.
*H01F 38/14* (2006.01)
*H02J 7/02* (2016.01)
*H02J 50/10* (2016.01)
*H01F 41/04* (2006.01)

(52) U.S. Cl.
CPC ............ *H01F 41/046* (2013.01); *H02J 7/025* (2013.01); *H02J 50/10* (2016.02); *Y10T 29/4902* (2015.01)

(56) References Cited

FOREIGN PATENT DOCUMENTS

| | | |
|---|---|---|
| JP | 2013-062386 A | 4/2013 |
| KR | 10-2012-0008200 A | 1/2012 |
| KR | 10-1179398 B1 | 9/2012 |

\* cited by examiner

[FIG. 1]
100
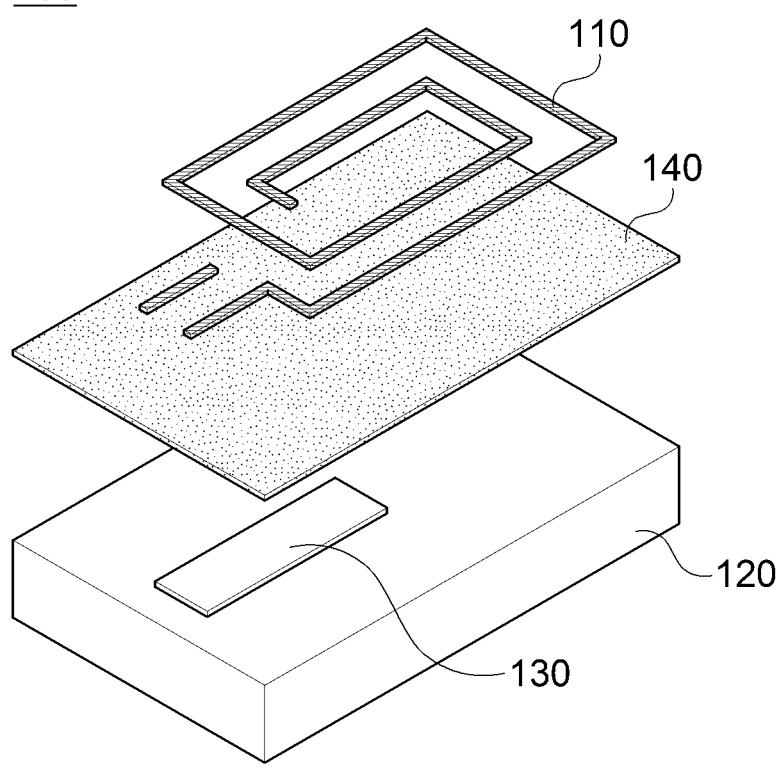
[FIG. 2]
100
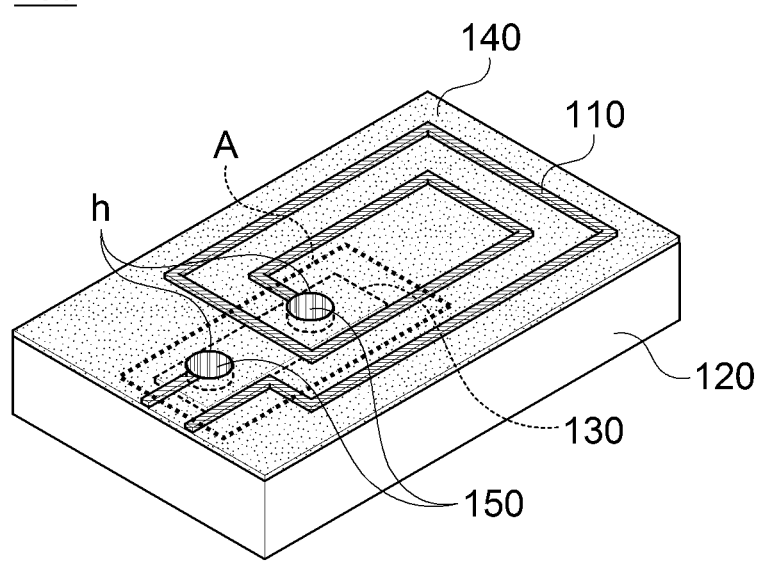

[FIG. 3]
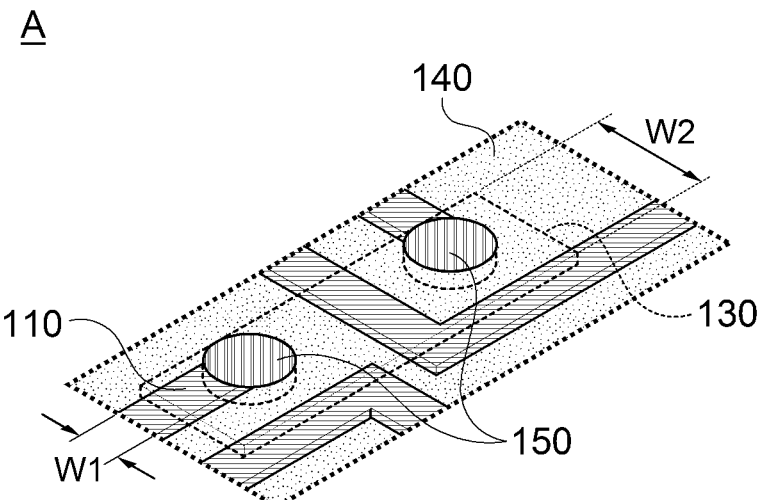
[FIG. 4]
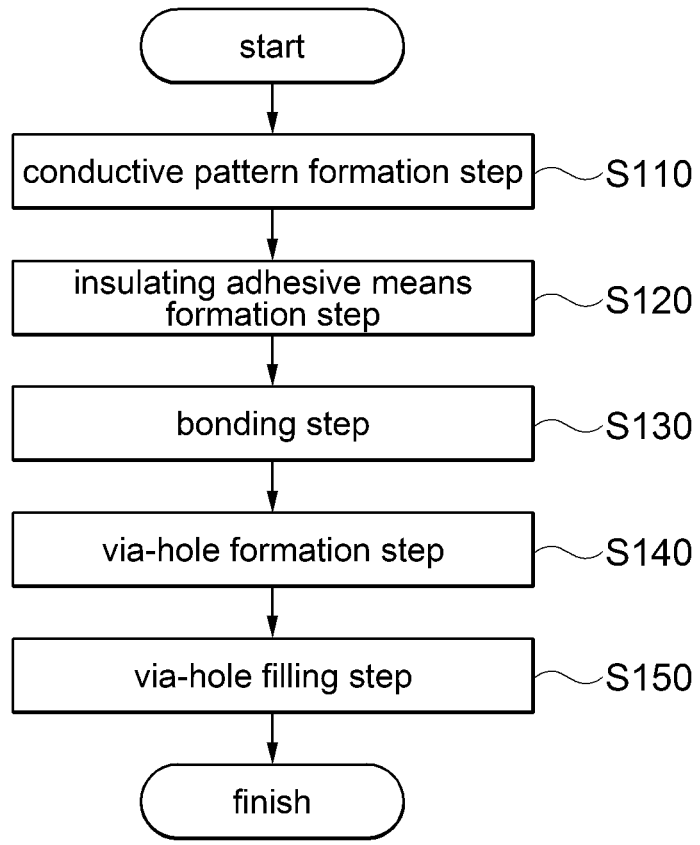

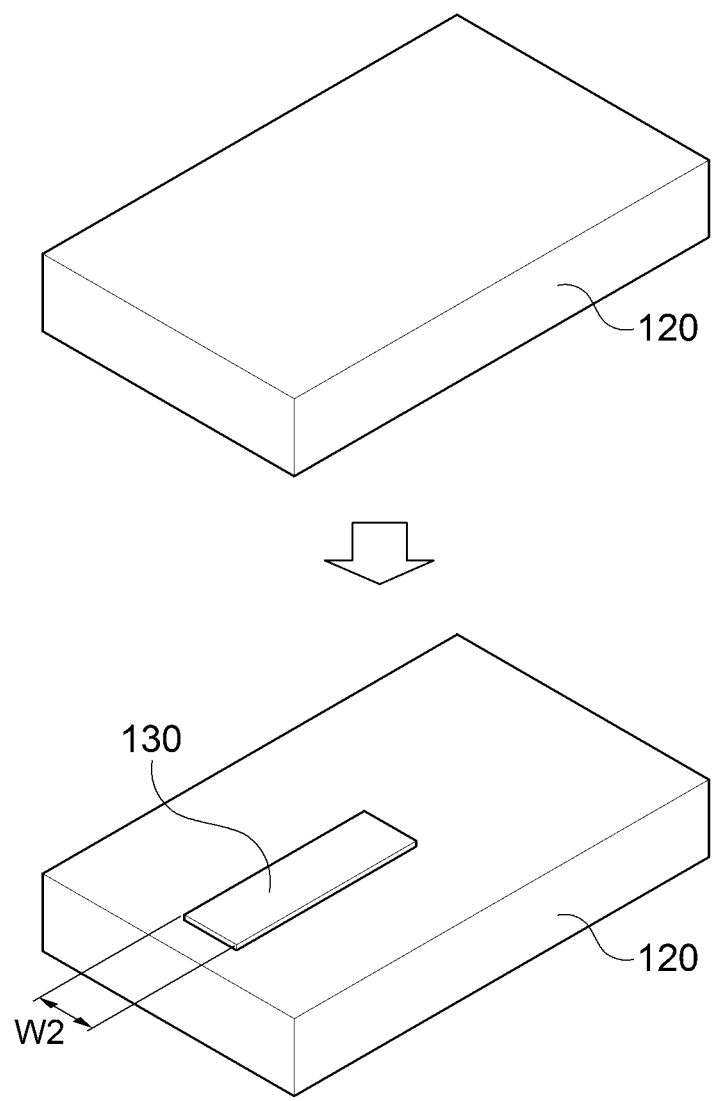
[FIG. 5]

[FIG. 6]
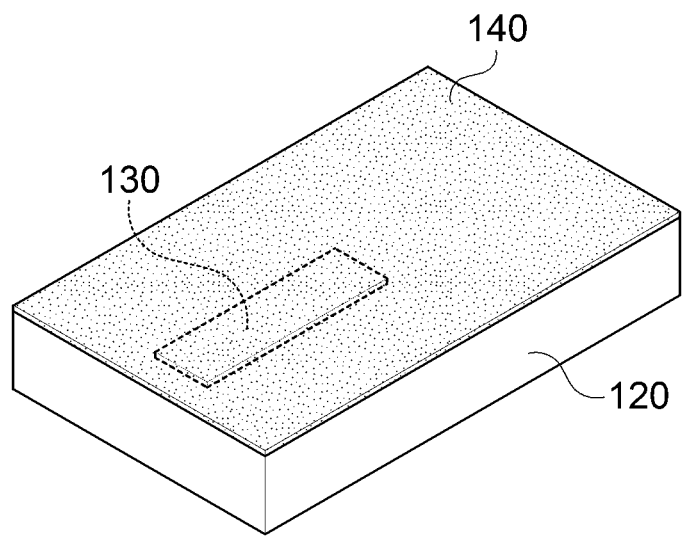
[FIG. 7]
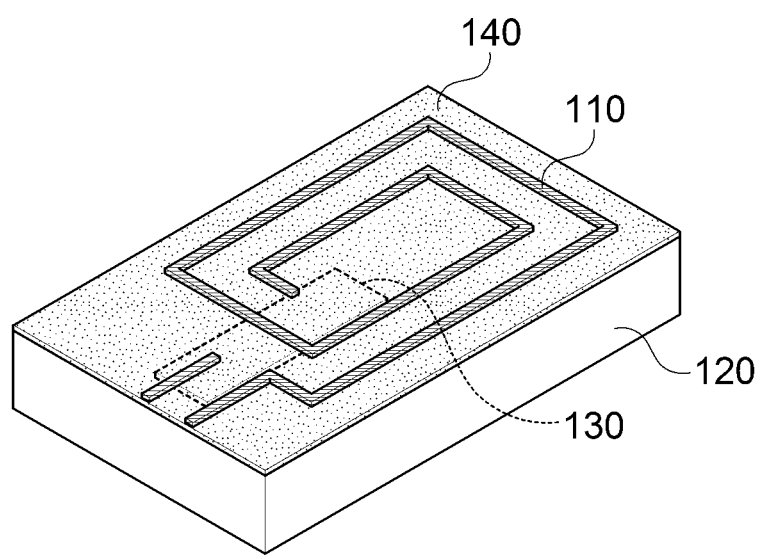

[FIG. 8]
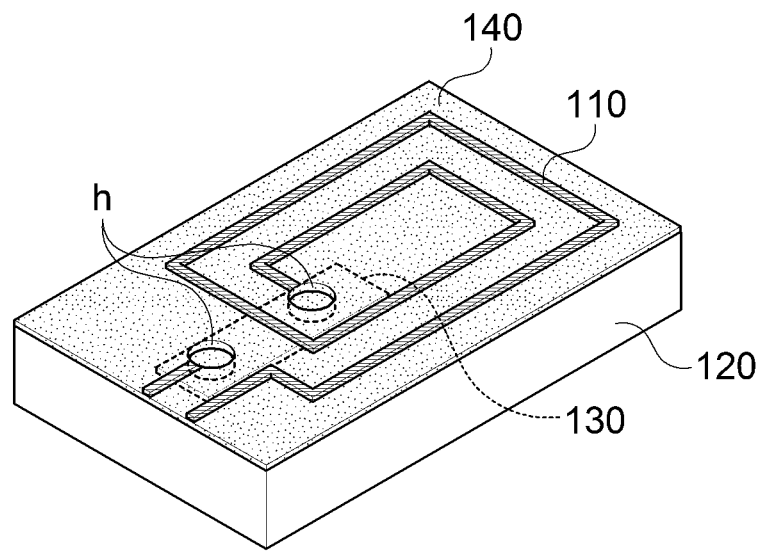
[FIG. 9]
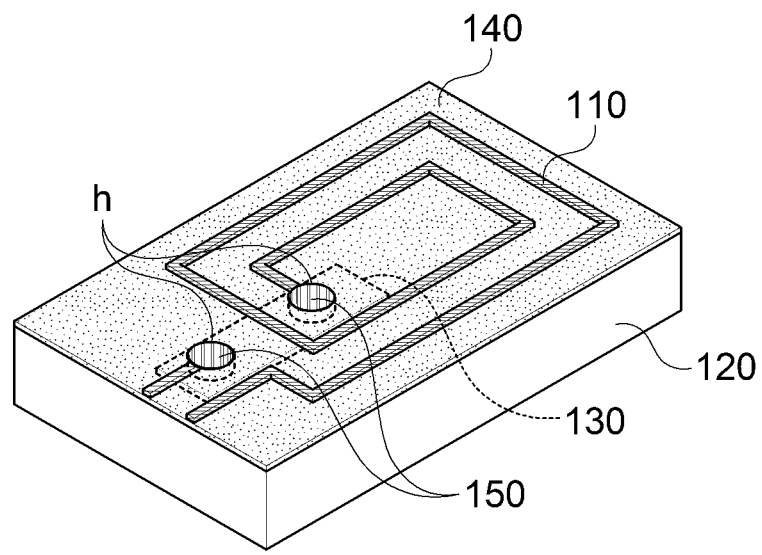

[FIG. 10]
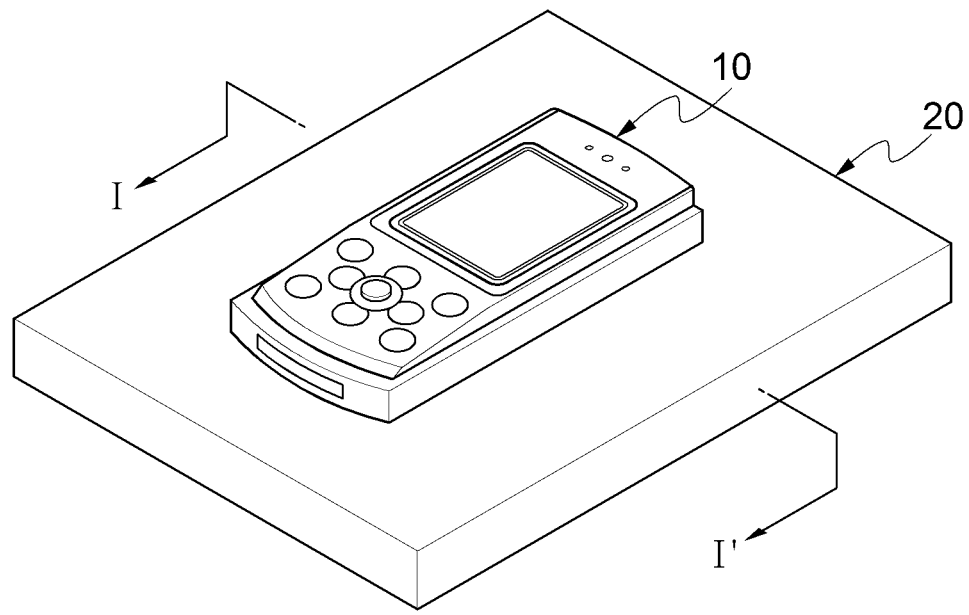
[FIG. 11]
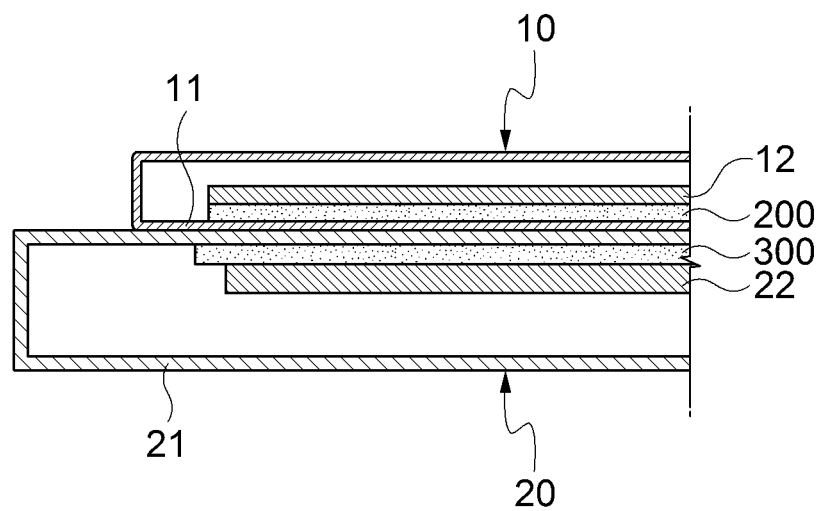

[FIG. 12]
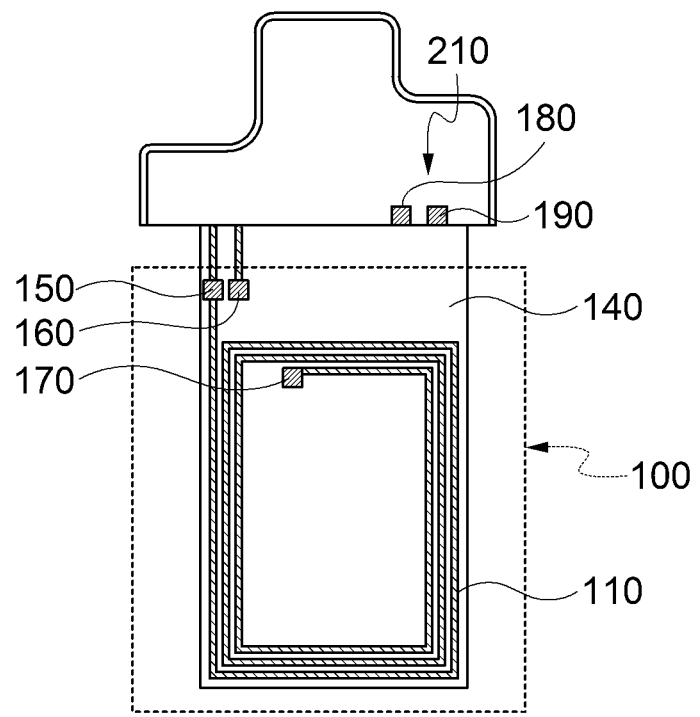

[FIG. 13A]
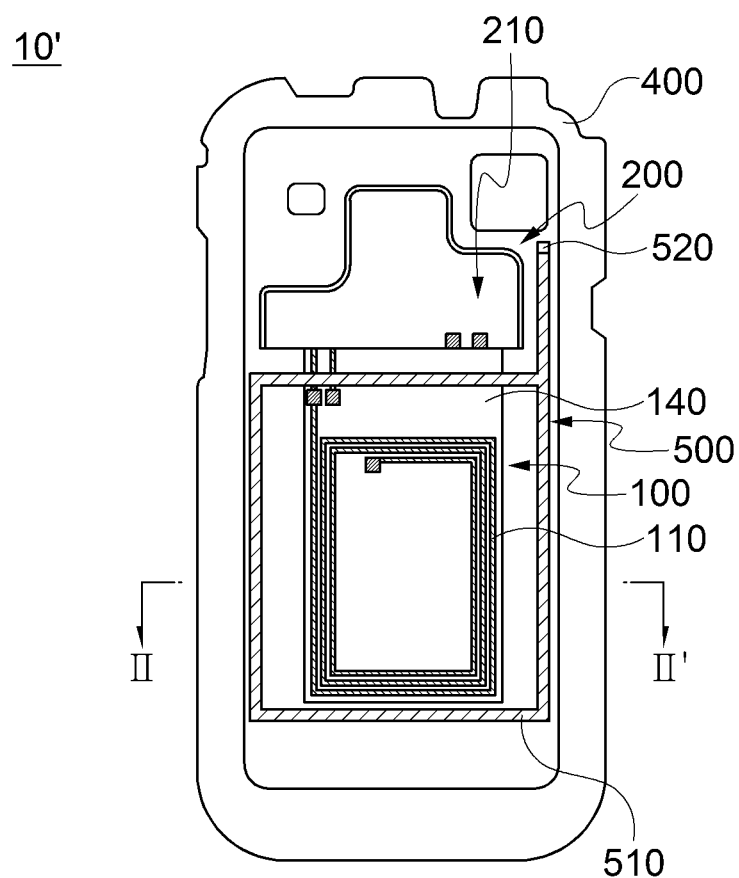
[FIG. 13B]
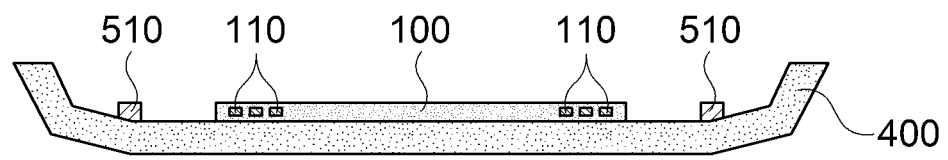

COIL TYPE UNIT FOR WIRELESS POWER TRANSMISSION, WIRELESS POWER TRANSMISSION DEVICE, ELECTRONIC DEVICE AND MANUFACTURING METHOD OF COIL TYPE UNIT FOR WIRELESS POWER TRANSMISSION

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2013-0097841, entitled filed Aug. 19, 2013, which is hereby incorporated by reference in its entirety into this application.

BACKGROUND OF THE INVENTION

1. Field of the Invention

The present invention relates to a coil type unit for wireless power transmission, a wireless power transmission device, an electronic device, and a manufacturing method of a coil type unit for wireless power transmission.

2. Description of the Related Art

In recent times, a wireless power transmission system has been studied to charge a secondary battery embedded in a mobile terminal etc.

In general, the wireless power transmission device includes a wireless power transmission device that transmits power and a wireless power reception device that receives and stores power.

The wireless power transmission device transmits and receives power using magnetic resonance and electromagnetic induction. For this, in recent times, studies and development have been continuously conducted to improve a wireless power transmission distance.

Therefore, there are active studies on reduction of power transmission time as well as maximization of wireless power transmission efficiency between the wireless power transmission device (wireless charger etc.) and the wireless power reception device (mobile terminal etc.). Among them, studies and development of a coil type unit for wireless power transmission in which a coil is provided in a magnetic body formed of a metal or ferrite sheet have been actively conducted.

Here, the coil in the coil type unit for wireless power transmission is a coil that electrically connects a plurality of coil patterns through a via-hole, but the thickness of the coil is increased and there are problems in terms of cost due to the plurality of coil patterns. Thus, recently, a coil (single-layered coil) in which a coil pattern is designed on the surface of a magnetic body in a loop shape has been widely used.

However, in case of the coil pattern designed in a loop shape, since the output wiring coil should pass over the wound coil wiring for electrical connection between an inner end (input terminal) and an outer end (output terminal) of the coil, the overall thickness of the coil becomes double.

Therefore, since the overall thickness of the coil is increased so that there are restrictions on slimming of a wireless power transmission device and an electronic device including the same and wiring forming and bonding processes for electrical connection are added, process costs are increased and manufacturing becomes inconvenient.

Therefore, in order to meet the current trend for thinner devices, there is a need for the development of a thinner coil type unit for wireless power transmission and a wireless power transmission device and an electronic device including the same.

RELATED ART DOCUMENT

Patent Document

Patent Document 1: Korean Patent Laid-Open Publication No. 2012-0008200

SUMMARY OF THE INVENTION

The present invention has been invented in order to overcome the above-described problems and it is, therefore, an object of the present invention to provide a coil type unit for wireless power transmission and a manufacturing method thereof, a wireless power transmission device, and an electronic device that can achieve slimming by minimizing the thickness of a coil.

Further, it is another object of the present invention to provide a coil type unit for wireless power transmission and a manufacturing method thereof, a wireless power transmission device, and an electronic device that can reduce process costs and facilitate manufacture thereof.

In accordance with one aspect of the present invention to achieve the object, there is provided a coil type unit for wireless power transmission, including: a coil pattern having a wiring pattern shape; a magnetic portion having the coil pattern attached to one surface thereof and a conductive pattern formed thereon; an insulating adhesive portion interposed between the magnetic portion having the conductive pattern formed thereon and the coil pattern to bond the magnetic portion and the coil pattern to each other while insulating the coil pattern and the conductive pattern from each other; and a conductive via for electrically connecting both ends of the coil pattern and the conductive pattern.

In an embodiment of the present invention, a wireless power transmission device may include a coil type unit for wireless power transmission in the present invention; and a circuit unit for wireless power transmission which is electrically connected to the coil type unit for wireless power transmission.

In an embodiment of the present invention, an electronic device may include a wireless power transmission device in the present invention; and a case for accommodating the wireless power transmission device therein.

And in accordance with another aspect of the present invention to achieve the object, there is provided a manufacturing method of a coil type unit for wireless power transmission, including: a conductive pattern formation step of forming a conductive pattern on a magnetic portion; an insulating adhesive means formation step of forming an insulating adhesive means on the magnetic portion having the conductive pattern formed thereon; a bonding step of bonding a coil pattern having a wiring pattern shape on the magnetic portion having the conductive pattern formed thereon through the formed insulating adhesive means while disposing both ends of the coil pattern in the position of the conductive pattern; a via-hole formation step of forming via-holes for connecting the both ends of the coil pattern and the conductive pattern; and a via-hole filling step of electrically connecting the both ends of the coil pattern and the conductive pattern by filling a conductive material in the via-holes.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is an exploded perspective view of a coil type unit for wireless power transmission in accordance with an embodiment of the present invention;

FIG. 2 is a perspective view of the coil type unit for wireless power transmission in accordance with an embodiment of the present invention;

FIG. 3 is an enlarged view of a portion A of FIG. 2;

FIG. 4 is a flowchart for explaining a manufacturing method of a coil type unit for wireless power transmission in accordance with an embodiment of the present invention;

FIG. 5 is a process diagram showing a conductive pattern formation step of FIG. 4;

FIG. 6 is a process diagram showing an insulating adhesive means formation step of FIG. 4;

FIG. 7 is a process diagram showing a bonding step of FIG. 4;

FIG. 8 is a process diagram showing a via-hole formation step of FIG. 4;

FIG. 9 is a process diagram showing a via-hole filling step of FIG. 4;

FIG. 10 is a perspective view schematically showing an electronic device and a charging device in accordance with an embodiment of the present invention;

FIG. 11 is a cross-sectional view taken along line I-I' of FIG. 10;

FIG. 12 is a perspective view of a wireless power reception device in accordance with an embodiment of the present invention; and FIG. 13A and FIG. 13B are views schematically showing an electronic device including a wireless power reception device and an antenna module in accordance with an embodiment of the present invention.

DETAILED DESCRIPTION OF THE PREFERABLE EMBODIMENTS

A matter regarding to an operational effect including a technical configuration for an object of a coil type unit for wireless power transmission and a manufacturing method thereof, a wireless power transmission device, and an electronic device in accordance with the present invention will be clearly appreciated through the following detailed description with reference to the accompanying drawings showing preferable embodiments of the present invention.

Further, in describing the present invention, descriptions of well-known techniques are omitted so as not to unnecessarily obscure the embodiments of the present invention. In the present specification, the terms "first," "second," and the like are used for distinguishing one element from another, and the elements are not limited by the above terms.

<Coil Type Unit for Wireless Power Transmission Device>

First, FIG. 1 is an exploded perspective view of a coil type unit 100 for wireless power transmission in accordance with an embodiment of the present invention. Further, FIG. 2 is a perspective view of the coil type unit 100 for wireless power transmission in accordance with an embodiment of the present invention and shows the coil type unit 100 for wireless power transmission including a conductive via 150.

As shown in FIGS. 1 and 2, the coil type unit 100 for wireless power transmission in accordance with the present embodiment may include a coil pattern 110, a magnetic portion 120, a conductive pattern 130, an insulating adhesive portion 140, and a conductive via 150.

First, the coil pattern 110 has a wiring pattern shape. As shown in FIGS. 1 and 2, the present embodiment takes the case in which the coil pattern 110 having a single-layered wiring pattern shape is formed in the shape of an overall rectangular vortex (loop), but the present invention is not limited thereto and allows various applications such as a circular or polygonal vortex as well as a multilayer wiring pattern.

Further, the magnetic portion 120 has the coil pattern 110 fixedly attached to one surface thereof and is provided to efficiently form a magnetic path of a magnetic field generated by the coil pattern 110. For this, the magnetic portion 120 is made of a material that can easily form a magnetic path. For example, the magnetic portion 120 may be formed by laminating and firing one or more magnetic casting sheets such as ferrite sheets.

However, the magnetic portion 120 according to the present embodiment does not limit the magnetic sheet only to the ferrite sheet and allows various applications such as use of at least one of a ferrite sheet, a metal sheet, and a hybrid type sheet that uses a combination of metal and ferrite as the magnetic sheet. At this time, the metal sheet may be made of Fe—Si—Al, Fe—Si—Cr, or Fe—Si—Al—Cr that can improve magnetic efficiency (permeability and Q-factor) or aluminum considering conductivity of a metal sheet layer but is not limited thereto.

Further, the conductive pattern 130 may be formed on the magnetic portion 120 as shown in FIGS. 1 and 2. As an example, the conductive pattern 130 may be simply formed on the magnetic portion 120 by a method of printing and laminating conductive ink or conductive paste. At this time, the conductive paste may be paste including silver powder, particularly paste including silver powder as a main material but is not limited thereto.

Further, the insulating adhesive portion 140 is interposed between the coil pattern 110 and the magnetic portion 120 having the conductive pattern 130 formed thereon to firmly fix and bond the coil pattern 110 and the magnetic portion 120 having the conductive pattern 130 formed thereon to each other.

The insulating adhesive portion 140 is disposed between the coil pattern 110 and the magnetic portion 120 having the conductive pattern 130 formed thereon as shown in FIGS. 1 and 2 to insulate the coil pattern 110 and the conductive pattern 130 on the magnetic portion 120 while bonding the coil pattern 110 and the magnetic portion 120 to each other.

The insulating adhesive portion 140 may be formed of an adhesive film or an adhesive tape or may be formed by coating an adhesive or a resin having adhesive properties on the surface of the magnetic portion 120. But the insulating adhesive portion 140 is not limited to the above configuration and allows various applications such as including ferrite powder to have magnetism with the magnetic portion 120.

Further, the conductive via 150 according to the present embodiment electrically connects both ends of the coil pattern 110 and the conductive pattern 130 formed on the magnetic portion 120.

Therefore, the conductive via 150 of the present embodiment may be formed by forming via-holes h in the both ends of the coil pattern 110 and the conductive pattern 130 and filling a conductive material in the via-holes h as shown in FIG. 2.

At this time, the via-holes h may be formed by a laser, CNC drilling, or punching process but are not limited thereto.

Further, the conductive via 150 of the present embodiment may be formed by filling conductive ink or conductive paste as a conductive material in the via-hole h. For example, at this time, the conductive paste may be paste including silver powder, particularly paste including silver powder as a main material but is not limited thereto and the via-hole h may be filled by a known method such as plating or soldering.

Meanwhile, FIG. 3 is an enlarged view of a portion A of FIG. 2 and shows an enlarged view of the periphery of the portion in which the conductive via 150 is formed in detail.

As shown in FIG. 3, it is preferred that the width W2 of the conductive pattern 130 having the conductive via 150 formed therein is larger than the width W1 of the coil pattern 110.

It is possible to reduce the thickness of the pattern as well as to transmit sufficient power by forming the conductive pattern 130 having a larger width to improve conductivity, thereby contributing to slimming of products. In addition, it is possible to facilitate the processes for forming the conductive via 150, that is, the via-hole forming process, the via-hole filling process, etc. by increasing the width of the conductive pattern 130 in which the conductive via 150 is formed.

<Manufacturing Method of Coil Type Unit for Wireless Power Transmission>

First, FIG. 4 is a flowchart for explaining a manufacturing method of a coil type unit for wireless power transmission in accordance with an embodiment of the present invention.

Referring to FIG. 4, the manufacturing method of a coil type unit for wireless power transmission in accordance with an embodiment of the present invention may include a conductive pattern formation step S110 of forming a conductive pattern on a magnetic portion, an insulating adhesive means formation step S120 of forming an insulating adhesive means on the magnetic portion having the conductive pattern formed thereon; a bonding step S130 of bonding a coil pattern having a wiring pattern shape on the magnetic portion having the conductive pattern formed thereon through the formed insulating adhesive means while disposing both ends of the coil pattern in the position of the conductive pattern; a via-hole formation step S140 of forming via holes for connecting the both ends of the coil pattern and the conductive pattern; and a via-hole filling step S150 of electrically connecting the both ends of the coil pattern and the conductive pattern by filling a conductive material in the via-holes formed in the via-hole formation step S140.

FIGS. 5 to 9 are process diagrams showing the manufacturing method of a coil type unit for wireless power transmission in accordance with an embodiment of the present invention and each step of the above manufacturing method will be specifically described below with reference to the process diagrams.

First, FIG. 5 is a process diagram showing the conductive pattern formation step S110 of FIG. 4.

Further, as shown in FIG. 5, in the conductive pattern formation step S110 according to the present embodiment, a conductive pattern 130 may be formed on a magnetic portion 120. At this time, as an example, the conductive pattern 130 may be simply formed on the magnetic portion 120 by printing and laminating conductive ink or conductive paste. At this time, the conductive paste may be paste including silver powder, particularly paste including silver powder as a main material but is not limited thereto.

Meanwhile, it is preferred that the width W2 of the conductive pattern 130 formed according to the present embodiment is larger than the width of a coil pattern bonded in the bonding step S130.

As described above, it is possible to reduce the thickness of the pattern as well as to transmit sufficient power by forming the conductive pattern 130 having a larger width to improve conductivity, thereby contributing to slimming of products. In addition, it is possible to facilitate the processes for forming a conductive via 150, that is, the via-hole forming process, the via-hole filling process, etc. by increasing the width of the conductive pattern 130 in which the conductive via 150 is formed.

Meanwhile, the magnetic portion 120 in the conductive pattern formation step S110 has the coil pattern fixedly attached to one surface thereof and is provided to efficiently form a magnetic path of a magnetic field generated by the coil pattern. For this, the magnetic portion 120 is made of a material that can easily form a magnetic path. For example, the magnetic portion 120 may be formed by laminating and firing one or more magnetic casting sheets such as ferrite sheets.

However, the magnetic portion 120 in the conductive pattern formation step S110 does not limit the magnetic sheet only to the ferrite sheet and allows various applications such as use of at least one of a ferrite sheet, a metal sheet, and a hybrid type sheet that uses a combination of metal and ferrite as the magnetic sheet. At this time, the metal sheet may be made of Fe—Si—Al, Fe—Si—Cr, or Fe—Si—Al—Cr that can improve magnetic efficiency (permeability and Q-factor) or aluminum considering conductivity of a metal sheet layer but is not limited thereto.

Next, FIG. 6 is a process diagram showing the insulating adhesive means formation step S120 of FIG. 4.

As shown in FIG. 6, in the insulating adhesive means formation step S120 according to the present embodiment, an insulating adhesive means 140 may be formed on the magnetic portion 120 having the conductive pattern 130 formed in FIG. 5. At this time, the insulating adhesive means 140 may be formed of an adhesive film or an adhesive tape or may be formed by coating an adhesive or a resin having adhesive properties on the surface of the magnetic portion 120 having the conductive pattern 130 formed in FIG. 5. But the insulating adhesive means 140 is not limited to the above configuration and allows various applications such as including ferrite power to have magnetism with the magnetic portion 120.

Next, FIG. 7 is a process diagram showing the bonding step S130 of FIG. 4.

As shown in FIG. 7, in the bonding step S130 according to the present embodiment, the coil pattern 110 having a wiring pattern shape is bonded to the magnetic portion 120 having the conductive pattern 130 formed in FIG. 5 by the insulating adhesive means 140 formed in FIG. 6. At this time, the coil pattern 110 may be bonded so that both ends of the coil pattern 110 are disposed in the position of the conductive pattern 130 of the magnetic portion 120.

At this time, the coil pattern 110 has a wiring pattern shape. As shown in FIG. 7, the present embodiment takes the case in which the coil pattern 110 having a single-layered wiring pattern shape is formed in the shape of an overall rectangular vortex, but the present invention is not limited thereto and allows various applications such as a circular or polygonal vortex as well as a multilayer wiring pattern.

Next, FIG. 8 is a process diagram showing the via-hole formation step S140 of FIG. 4.

As shown in FIG. 8, in the via-hole formation step S140 according to the present embodiment, via-holes h may be formed to connect the both ends of the coil pattern 110 bonded in FIG. 7 and the conductive pattern 130 on the magnetic portion 120 formed in FIG. 5. At this time, the via-holes h may be formed by a laser, CNC drilling, or punching process but are not limited thereto.

Next, FIG. 9 is a process diagram showing the via-hole filling step S150 of FIG. 4.

As shown in FIG. 9, in the via-hole filling step S150 according to the present embodiment, the conductive via 150 may be formed to electrically connect the both ends of the coil pattern 110 and the conductive pattern 130 by filling a conductive material in the via-holes h formed in FIG. 8.

Further, in the via-hole filling step S150 according to the present embodiment, the conductive material filled in the via-holes h may be conductive ink or conductive paste. For example, at this time, the conductive paste may be paste including silver powder, particularly paste including silver powder as a main material but is not limited thereto and the via-hole h may be filled by a known method such as plating or soldering.

<Wireless Power Transmission Device and Electronic Device>

FIG. 10 is a perspective view schematically showing an electronic device 10 and a charging device 20 in accordance with an embodiment of the present invention, and FIG. 11 is a cross-sectional view taken along line I-I' of FIG. 10.

Referring to FIGS. 10 and 11, the electronic device 10 according to the present embodiment may include a battery 12, a wireless power reception device 200, and cases 11 and 21.

First, the battery 12, which stores power generated from the wireless power reception device 200, may be a rechargeable secondary battery and configured to be detachable from the electronic device 10.

Further, the wireless power reception device 200, which supplies power to the battery 12 to charge the battery 12, may be accommodated in the case 11 of the electronic device 10 to be directly attached to the inner surface of the case 11 or disposed as close as possible to the inner surface of the case 11.

Further, the charging device 20 according to the present embodiment is provided to charge the battery 12 of the electronic device 10. For this, the charging device 20 may have a wireless power transmission device 300 inside the case 21 thereof.

The cases 11 and 21, which accommodate the wireless power transmission device therein, may be an external case frame of the electronic device 10 or a case frame of the battery 12.

Further, the charging device 20 converts household AC power supplied from the outside into DC power and converts the DC power into an AC voltage of specific frequency again to provide the AC voltage to the wireless power transmission device 300. For this, the charging device 20 may have a voltage converter 22 for converting household AC power into an AC voltage of specific frequency.

When the above AC voltage is applied to a coil of the wireless power transmission device 300, a magnetic field around the coil is changed. Therefore, a voltage is applied to the wireless power reception device 200 of the electronic device 10 adjacent to the wireless power transmission device 300 according to the changes in the magnetic field and thus the battery 12 is charged.

Hereinafter, the wireless power reception device 200 provided in the electronic device 10 will be described.

FIG. 12 is a perspective view of the wireless power reception device 200 in accordance with an embodiment of the present invention. As shown in FIG. 12, the wireless power reception device 200 according to the present embodiment may include a coil type unit 100 for wireless power transmission in accordance with the above-described embodiment of the present invention and a circuit unit 210 for wireless power transmission.

At this time, the coil type unit 100 and the circuit unit 210 according to the present embodiment are electrically connected to each other. For example, as shown in FIG. 12, the coil type unit 100 and the circuit unit 210 may be electrically connected by a first contact pad 150 and a second contact pad 160.

Although not limited thereto, when both ends of a coil consist of an inner end and an outer end like the coil type unit 100 of the present embodiment, the coil type unit 100 and the circuit unit 210 of the present embodiment may be electrically connected by connecting a third contact pad 170 formed on the inner end to the second contact pad 160 of the outer end through a conductive pattern, which is formed on a magnetic portion to be embedded in an insulating adhesive portion 140, and a conductive via.

Meanwhile, first and second external connection pads 180 and 190 may be formed in the circuit unit 210 for wireless power transmission of the present embodiment.

Therefore, power received through the coil type unit 100 of the present embodiment can be connected to a battery (not shown) through the first and second external connection pads 180 and 190 after being processed through the circuit unit 210 of the present embodiment.

The first and second external connection pads 180 and 190 and the first to third connection pads 150, 160, and 170 of the present embodiment may be connected in various ways. For example, the first and second external connection pads 180 and 190 may be electrically connected by a separate wire. Further, the first to third contact pads 150, 160, and 170 may electrically connect the coil type unit 100 and the circuit unit 210 using a wiring pattern embedded or formed in the insulating adhesive portion 140 of the coil type unit 100.

Further, the wireless power reception device 200 of the present embodiment configured as above can be attached to a structure inside a mobile phone case etc. by a simple method such as an adhesive or a double-sided tape, thus reducing manufacturing costs and process costs.

Meanwhile, the configuration of the wireless power reception device 200 described above can be equally applied to the wireless power transmission device 300 provided in the charging device 20. Therefore, detailed descriptions of the wireless power transmission device 300 will be omitted.

FIG. 13 shows an electronic device 10' including a wireless power reception device 200 and an antenna module 500 in accordance with an embodiment of the present invention.

The electronic device 10' according to the present embodiment includes a wireless power reception device 200 according to the present embodiment and a case 400 for accommodating the wireless power reception device 200 inside thereof.

As described above, since the wireless power reception device 200 according to the present embodiment is implemented with a coil type unit 100 in which both ends of a coil pattern are electrically connected through a conductive pattern, which is formed on a magnetic portion to be embedded in an insulating adhesive portion 140, and a conductive via, it can be slimmed. Further, the wireless power reception device 200 according to the present embodiment can be simply attached inside the case 400 by means such as a double-sided tape and an adhesive.

Further, the electronic device 10' according to the present embodiment may have interference between the wireless power reception device 200 and an antenna according to the frequency used when the wireless power reception device 200 and the various antennas are accommodated together.

Particularly, in case of wireless power transmission, power transmission may be performed in the low frequency band of 1 kHz to 10 MHz. In this case, the interference between the wireless power reception device 200 and the antenna may occur according to the position thereof when the frequency used is low like a low frequency band antenna.

Further, there are many constraints on space layout inside the electronic device 10' according to the miniaturization of the electronic device 10'. In addition, there are also constraints on layout of the wireless power transmission device and the low frequency antenna in order to prevent the interference between the wireless power transmission device and the low frequency antenna.

Referring to FIGS. 13*a* and 13*b*, the electronic device 10' according to the present embodiment may include the wireless power reception device 200 and the antenna module 500.

First, the wireless power reception device 200, as described above, may include a coil type unit 100 for wireless power transmission and a circuit unit 210 according to the present embodiment.

Further, the antenna module 500 may include an antenna pattern 510 formed to surround a coil pattern 110 in the wireless power reception device 200.

At this time, the antenna module 500 of the present embodiment may include the antenna pattern 510 and one or more connection terminals 520 connected to the antenna pattern 510 and a circuit board corresponding to the antenna pattern 510.

As shown in FIG. 13*b* showing a cross-section taken along line II-II' of FIG. 13*a*, the antenna pattern 510 of the antenna module 500 may be formed to surround the coil pattern 110 of the coil type unit 100 of the wireless power reception device 200, thus preventing the interference between the antenna pattern 510 and the coil pattern 110.

Further, the antenna module 500 of the present embodiment may be at least one selected from the group consisting of a near field communication (NFC) antenna, a radio frequency identification (RFID) antenna, a frequency modulation (FM) antenna, a digital multimedia broadcasting (DMB) antenna, and a wireless charging NFC antenna but can use various types of antennas without being necessarily limited to the above antennas.

Since the coil pattern in the wireless power transmission device of the present embodiment uses a frequency of 1 kHz to 10 MHz, the layout of the coil pattern and the antenna pattern according to the present embodiment can improve frequency reception efficiency and accuracy when applied to an NFC antenna and an RFID antenna using a frequency of 10 kHz to 100 MHz.

It is possible to implement a low frequency antenna such as an NFC or RFID antenna using 13.56 MHz with the wireless power transmission device (wireless power reception device) even when using 125 kHz band as a wireless power transmission frequency by forming the antenna pattern to surround the coil pattern as above.

The antenna module 500 of the present embodiment may be disposed above or below the wireless power reception device 200 or may be attached to the case 400 with the wireless power reception device 200.

The electronic device 10' described above can be equally applied to the configuration in which the antenna module 500 is applied to a wireless power transmission device 300. Thus, detailed descriptions of the electronic device in which the antenna module 500 is applied to the wireless power transmission device 300 will be omitted.

According to the coil type unit for wireless power transmission and the manufacturing method thereof in accordance with the present embodiment described above, it is possible to electrically connect the both ends (inner end and outer end) of the coil pattern through a conductive pattern and a conductive via by including the conductive pattern which is formed on the magnetic portion to be embedded in the insulating adhesive portion.

Therefore, according to the coil type unit for wireless power transmission and the manufacturing method thereof in accordance with the present embodiment, since it is not needed to pass the output wiring coil over the wound coil wiring for the electrical connection between the inner end and the outer end of the coil, it is possible to prevent the overall increase in the thickness of the coil due to the electrical connection between the both ends of the coil.

Therefore, according to the coil type unit for wireless power transmission and the manufacturing method thereof in accordance with the present embodiment, it is possible to achieve slimming by minimizing the thickness of the coil and achieve even slimming of the wireless power transmission device and the electronic device including the coil type unit of the present embodiment.

Further, according to the coil type unit for wireless power transmission and the manufacturing method thereof in accordance with the present embodiment, as described above, since it is not needed to pass the output wiring coil over the wound coil wiring for the electrical connection between the inner end and the outer end of the coil, additional processes of forming additional wiring or performing bonding for the electrical connection between the both ends of the coil are not needed, thus reducing process costs and facilitating manufacture thereof.

As described above, the coil type unit for wireless power transmission and the manufacturing method thereof, the wireless power transmission device, and the electronic device according to the present invention can minimize the thickness of the coil by electrically connecting the both ends of the coil pattern using the conductive pattern which is formed on the magnetic portion to be embedded in the insulating adhesive means, thereby achieving slimming of the wireless power transmission device and the electronic device including the coil type unit for wireless power transmission as well as the coil type unit for wireless power transmission.

Further, the coil type unit for wireless power transmission and the manufacturing method thereof, the wireless power transmission device, and the electronic device according to the present invention have no need for additional processes such as additional wiring forming and bonding for electrical connection by electrically connecting the both ends of the coil pattern using the conductive pattern which is formed on the magnetic portion to be embedded in the insulating adhesive means, thereby reducing process costs and facilitating manufacture thereof.

Reference in the specification to "an embodiment" of the present principles, as well as other variations thereof, means that a particular feature, structure, characteristic, and so forth described in connection with the embodiment is included in at least one embodiment of the present principles. Thus, the appearances of the phrase "in an embodiment", as well as any other variations, appearing in various places throughout the specification are not necessarily all referring to the same embodiment.

While operations are depicted in the drawings of the present invention, this should not be understood as requiring that such operations be performed in the particular order shown or that all illustrated operations be performed to achieve desirable results. In certain circumstances, multitasking and parallel processing may be advantageous.

In the specification, "at least one of" in the case of "at least one of A and B" is intended to encompass the selection of the first listed option (A) only, or the selection of the second listed option (B) only, or the selection of both options (A and B). As a further example, the case of "at least one of A, B, and C" is intended to encompass the selection of the first listed option (A) only, or the selection of the second listed option (B) only, or the selection of the third listed option (C) only, or the selection of the first and second listed options (A and B) only, or the selection of the second and third listed options (B and C) only, or the selection of all three options (A, B, and C). This can be extended, as readily apparent by those skilled in the related arts, for as many items listed.

So far the preferable embodiments of the present invention have been described. All the embodiments and conditional examples disclosed through the specification are intended to help those skilled in the art to understand the principles and concepts of the present invention, and it will be appreciated by those skilled in the art that the present invention can be implemented in a modified form without departing from the essential characteristics of the present invention. Therefore, the embodiments should be considered in descriptive sense and not for purpose of limitation. The scope of the present invention is defined by the appended claims rather than the foregoing description, and all differences within the scope will be construed as being included in the present invention.

What is claimed is:

1. A coil type unit for wireless power transmission, comprising:
    a coil pattern comprising a conductive wire;
    a magnetic portion having a conductive pattern formed thereon, the conductive pattern being wider than the conductive wire of the coil pattern;
    an insulating adhesive portion interposed between the magnetic portion and the coil pattern to bond the magnetic portion and the coil pattern to each other while insulating the coil pattern and the conductive pattern from each other; and
    a conductive via electrically connecting an end of the coil pattern and the conductive pattern,
    wherein a first face of the conductive pattern is in contact with the magnetic portion and a second face of the conductive pattern is in contact with the insulating adhesive portion.

2. The coil type unit for wireless power transmission according to claim 1, wherein the conductive pattern is formed using conductive ink or conductive paste.

3. The coil type unit for wireless power transmission according to claim 1, wherein the magnetic portion is formed by performing firing after laminating one or more magnetic sheets.

4. The coil type unit for wireless power transmission according to claim 3, wherein the magnetic sheet is at least one of a ferrite sheet, a metal sheet, and a hybrid type sheet which uses a combination of metal and ferrite.

5. The coil type unit for wireless power transmission according to claim 1, wherein the insulating adhesive portion is formed of an adhesive film or an adhesive tape.

6. The coil type unit for wireless power transmission according to claim 1, wherein the insulating adhesive portion is formed by coating an adhesive or a resin having adhesive properties.

7. The coil type unit for wireless power transmission according to claim 1, wherein the conductive via is formed by forming via-holes in the end of the coil pattern and the conductive pattern and filling conductive ink or conductive paste in the via-holes.

8. A wireless power transmission device comprising a coil type unit for wireless power transmission and a circuit unit for wireless power transmission electrically connected to the coil type unit for wireless power transmission, wherein the coil type unit for wireless power transmission comprises:
    a coil pattern comprising a conductive wire;
    a magnetic portion;
    a conductive pattern formed on the magnetic portion, the conductive pattern being wider than the conductive wire of the coil pattern;
    an insulating adhesive portion interposed between the magnetic portion and the coil pattern to bond the magnetic portion and the coil pattern to each other while insulating the coil pattern and the conductive pattern from each other; and
    a conductive via electrically connecting an end of the coil pattern and the conductive pattern,
    wherein a first face of the conductive pattern is in contact with the magnetic portion and a second face of the conductive pattern is in contact with the insulating adhesive portion.

9. An electronic device comprising a wireless power transmission device and a case for accommodating the wireless power transmission device therein, wherein the wireless power transmission device comprises:
    a coil type unit for wireless power transmission; and
    a circuit unit for wireless power transmission electrically connected to the coil type unit for wireless power transmission, wherein the coil type unit for wireless power transmission comprises:
    a coil pattern comprising a conductive wire;
    a magnetic portion;
    a conductive pattern formed on the magnetic portion, the conductive pattern being wider than the conductive wire of the coil pattern;
    an insulating adhesive portion interposed between the magnetic portion and the coil pattern to bond the magnetic portion and the coil pattern to each other while insulating the coil pattern and the conductive pattern from each other; and
    a conductive via electrically connecting an end of the coil pattern and the conductive pattern,
    wherein a first face of the conductive pattern is in contact with the magnetic portion and a second face of the conductive pattern is in contact with the insulating adhesive portion.

10. The electronic device according to claim 9, further comprising:
    an antenna module surrounding the coil pattern of the wireless power transmission device.

11. The electronic device according to claim 10, wherein the antenna module is at least one selected from the group consisting of a near field communication (NFC) antenna, a radio frequency identification (RFID) antenna, a frequency modulation (FM) antenna, a digital multimedia broadcasting (DMB) antenna, and a wireless charging NFC antenna.

\* \* \* \* \*